Patented Feb. 18, 1941

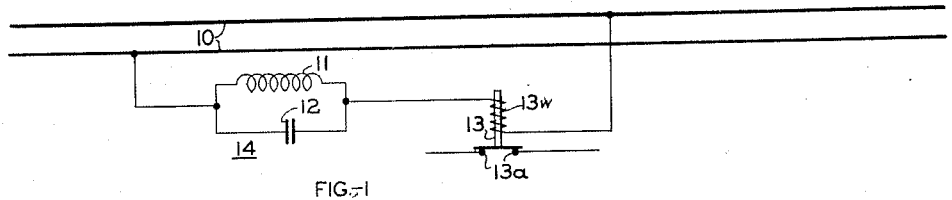
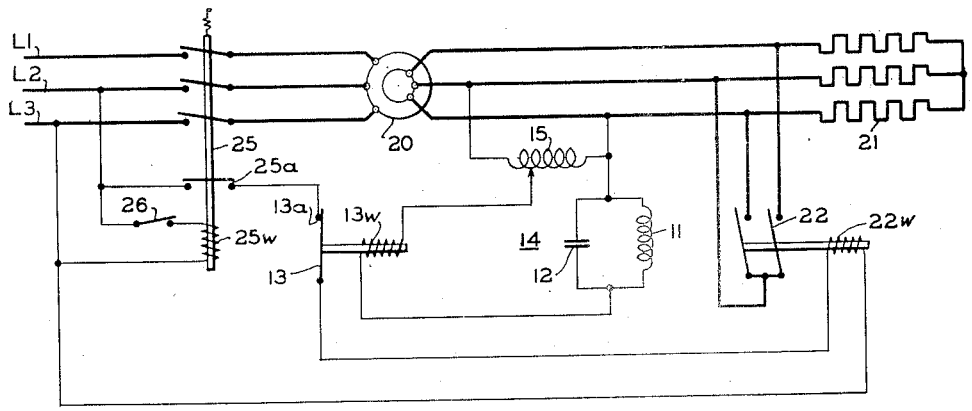
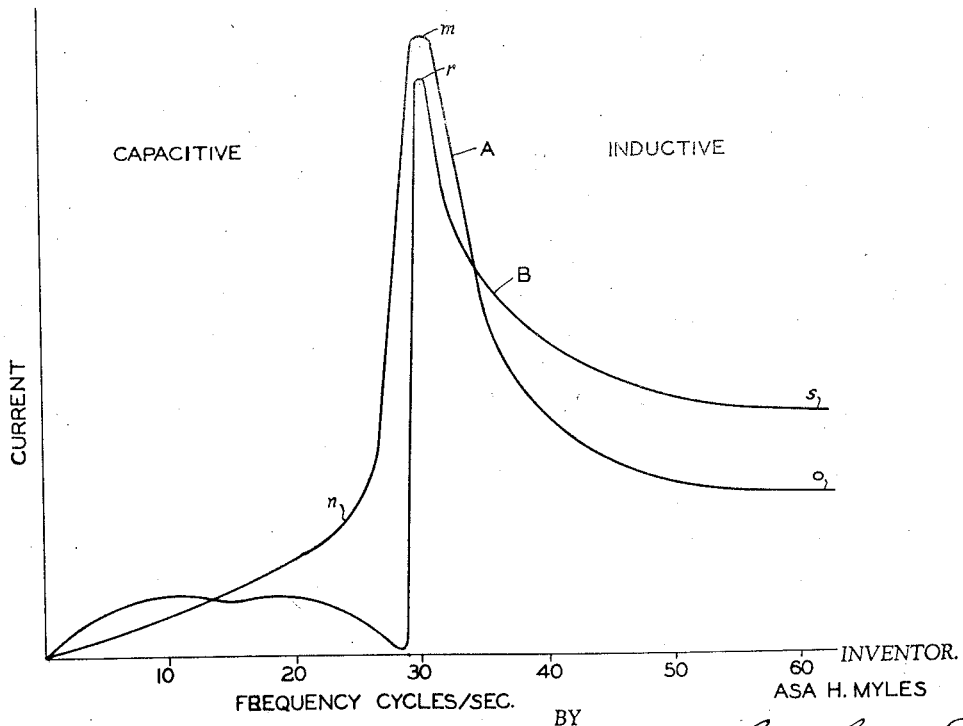

2,232,257

UNITED STATES PATENT OFFICE 2,232,257

ELECTRICAL CONTROL CIRCUIT

Asa H. Myles, Euclid, Ohio, assignor to The Electric Controller & Manufacturing Company, Cleveland, Ohio, a corporation of Ohio Original application July 16, 1938, Serial No. 219,585. Divided and this application April 7, 1939, Serial No. 266,623

9 Claims. (Cl. 175—320)

This invention relates to electrical control circuits, and particularly to control circuits which depend upon the phenomena of resonance for their operation.

This application is a division of my co-pending application filed July 16, 1938, Serial No. 219,585, which describes and claims an electrical control system and method for synchronizing a pair of synchronous-tie motors while they are rotating, and in which system and method the present invention is utilized. The invention is shown and described herein for illustrative purposes only as applied to the control of the acceleration of a wound rotor induction motor and is claimed broadly for use in a control circuit which may have other uses than that shown by way of illustration. Embodiments of the invention in connection with other electrical devices are apparent from the illustrated example and will not be specifically described.

Under normal operating conditions, the flux in the air gap of a polyphase induction motor is constant, and the magnitude and frequency of the induced rotor voltage are each dependent upon the difference in speed between the rotating magnetic field set up by excitation of the primary windings and the speed of the rotor in space. The magnitude of the induced rotor voltage at standstill is equal to the magnitude of the supply voltage, if it is assumed that the motor has a transformation ratio of unity, and the frequency of the induced rotor voltage at standstill is equal to the frequency of the source of supply.

During acceleration of the motor, both the frequency and magnitude of the rotor voltage decrease in accordance with the increase in speed of the rotor so that, at normal operating speeds, the induced rotor voltage becomes extremely small and of low frequency, and at synchronous speed the rotor voltage is zero. If the motor is driven above synchronous speed, the magnitude and frequency of the rotor voltage increase in accordance with the speed, becoming, at twice synchronous speed, again equal respectively to the magnitude and frequency of the source. Both the magnitude and frequency of the induced voltage thus vary inversely with the speed up to synchronous speed, and directly with the speed at speeds above synchronism.

Since both the magnitude and frequency of the rotor voltage vary concurrently in the same direction with respect to each other, an ordinary inductive relay cannot be made responsive to the variations. The reason for this is that as the frequency declines, there is a tendency for more relay current to flow through the inductive circuit, but, since the voltage is concurrently declining, the relay current remains substantially constant. The same result occurs if the frequency and voltage are concurrently increasing.

In a co-pending application of John D. Leitch, which resulted in Patent No. 2,165,491 on July 11, 1939, a series resonant control circuit including a relay coil is shown connected for energization to the rotor circuit of an induction motor. At standstill the current through the relay coil is sufficient to cause operation. During acceleration of the motor, because of the phenomenon of series resonance, the current through the relay coil suddenly decreases at a predetermined frequency and magnitude of rotor voltage, and the relay operates to perform a control function upon the motor.

The present invention utilizes the phenomenon of parallel resonance in addition to the phenomenon of series resonance. As a result of the connections giving the additional resonant condition, a sharper change in the control circuit current occurs at the predetermined electrical condition, and higher currents may be caused to flow through the control circuit under electrical conditions in which the voltage and frequency are higher than the resonant values. Thus the addition of the parallel connected inductance to the series-resonant circuit increases the degree of the control circuit current change as the control circuit passes from a capacitive to an inductive condition.

The improved control circuit of this invention includes a non-saturable inductance and a condenser connected in series with each other and an additional non-saturable inductance connected in parallel with the condenser. The additional inductance and the condenser are adapted to become parallel resonant at a predetermined electrical condition, and the condenser and the series connected inductance are adapted to become series resonant at an electrical condition almost the same as the parallel resonant condition. At parallel resonance the impedance of the parallel connected condenser-inductance combination is a maximum, and the total current through the control circuit is accordingly small. At series resonance the impedance of the series connected condenser-inductance combination is small, and the total current through the control circuit is a maximum.

It was found experimentally that under electrical conditions in which both the frequency and voltage are higher than the resonant values, more current flows through the control circuit than would normally be expected, and under electrical conditions in which both the frequency and voltage are lower than the resonant values, an extremely small control circuit current flows. For this reason, if the series connected inductance is a relay coil, as in the illustrative example, the relay current when the relay is connected to a rotor circuit of an induction motor is large at standstill, and small after the resonant conditions have occurred. Electrical responsive means other than a relay if associated with the circuit would correspondingly be positively actuated by such definite and great changes in current flow.

One of the principal objects of the present invention is to provide a new and improved means responsive to the electrical condition of a circuit in which the frequency and voltage are varying concurrently in the same direction.

A correlative object is to provide a new and improved means responsive to the electrical condition of a secondary circuit of an alternating current motor for controlling the operation of the motor in accordance with said condition.

Another object of the invention is to provide, in combination with a resonant control circuit, a means for altering the normal operative effect resulting from a change from a predetermined condition to a different condition, one of which conditions is series resonant and the other of which conditions is not series resonant, the circuit including a capacitance and an inductance which are connected in series and are responsive to coexistent variations in voltage and frequency of a supply circuit, and which become series resonant at a predetermined value of said voltage and frequency when said voltage and frequency are varying concurrently in the same direction.

Another object of the invention is to provide a control circuit which, when connected for energization to a power circuit in which the voltage and frequency are varying concurrently in the same direction, becomes series resonant under some electrical conditions of said power circuit and parallel resonant under other electrical conditions.

A further object of the invention is to provide a doubly resonant control circuit responsive to the electrical condition of a secondary circuit of an alternating current motor for controlling the operation of the motor in accordance with said condition.

A further object of the invention is to provide a resonant control circuit which, when connected for energization to a secondary circuit of an alternating current motor, is extremely sensitive to variations in the electrical condition of the secondary circuit.

A more specific object is to provide a relay circuit including an inductance and condenser connected in parallel and in series with a relay coil, the inductance and condenser combination being adapted to become parallel resonant when a predetermined voltage of a predetermined frequency is impressed thereon, and the relay coil and condenser adapted to become series resonant when a different predetermined voltage of a different predetermined frequency is impressed thereon.

A further specific object is to provide a control circuit responsive to variations in the electrical condition of the rotor circuit of an induction motor during acceleration or deceleration and in which the control circuit current is much greater at low speeds than at higher speeds.

Other objects and advantages will become apparent from the following specification, wherein reference is made to the drawing, in which—

Fig. 1 is a simplified wiring diagram illustrating the invention;

Fig. 2 is a simplified wiring diagram illustrating the invention and the manner in which the invention may be used for controlling the operation of a wound rotor induction motor; and Fig. 3 is a graph showing comparative frequency and voltage response curves between the present invention and the prior art.

In Fig. 1, 10 represents a source of electrical energy having a variable electrical condition in which the voltage and frequency concurrently vary in the same direction. This interrelation of voltage and frequency occurs in the output from a synchronous generator as it comes up to speed, and also is present in the secondary circuits of polyphase alternating current motors during acceleration or deceleration. A non-saturable inductance 11, a condenser 12, and an additional inductance illustrated as an operating winding 13w for a relay 13 are connected in a control operating circuit 14 across the source 10. The inductance 11 and condenser 12 are connected in parallel with each other and in series with the winding 13w. The relay 13 has contacts 13a which may control some electrical device in accordance with the electrical condition of the source 10.

Referring to Fig. 3, curve A is a typical current-frequency response curve for a series resonant circuit under a variable electrical condition in which the voltage and frequency vary concurrently in the same direction. It will be noted that curve A on the capacitive side of the resonance point m slopes gradually over a wide range of frequencies to a point n which may be considered the deenergization point. It is true that by lowering the resistance of such a control circuit, the slope of this portion of the curve could be made much steeper, but from a practical standpoint of an operative control circuit design, this is impossible. It will also be noted that over the portion o of the curve A in the higher frequency ranges, the control circuit current is not much greater than it is at the point n. It is obvious from the curve A that the current at the point n must be as high as possible to obtain a definite cut-off and also that the current at point n cannot be higher than the current at point o. Therefore, if a relay is used, the current in the relay circuit at pick-up cannot be much greater than at drop-out, and a tendency toward erratic operation under some conditions results.

A series resonant circuit gives minimum impedance at resonance for a fixed total resistance, and, as is well known, parallel resonance gives maximum impedance at resonance for a fixed total inductance. This difference between the impedance of a series circuit and of a parallel circuit at resonance is of great importance in radio, as by its use it is possible to tune a radio receiver so that it will respond to a definite frequency and at the same time suppress an undesirable frequency.

Because of the inherent high resistance of the operating winding of any electro-responsive device such as a relay sensitive enough to respond to variations in the electrical condition of the secondary windings of alternating current motors, the drop in the current-frequency curve on the capacitive side of resonance in a series resonant circuit cannot be made steep enough for all purposes in the region of current values below the current values on the inductive side which must cause energization of the relay. A series-parallel resonant circuit tuned to give series resonance at, for instance, 30 cycles, and parallel resonance at 28 or 29 cycles, was found to give a steeper drop in current in the desired region than had heretofore been obtainable. Furthermore, it was found that the current on the inductive side of the resonance point remained at an extremely high value, thus eliminating the erratic operation which sometimes occurred when a series resonant circuit alone was used. This advantageous result can be explained by the fact that the parallel combination at voltages and frequencies above resonance is capacitive and has a greater capacitive effect than if the condenser alone were present, resulting in a lower total impedance at all frequencies and voltages above resonance.

One way in which the control circuit 14 of Fig. 1 can be used to control an induction motor during acceleration is shown in Fig. 2. It is understood that several steps of acceleration can be provided by merely using extra relay circuits and contactors in the same manner as shown for the single step, the respective relay circuits being adjustable to become resonant at different electrical conditions. Such a control system using series type resonant circuits is disclosed in the aforementioned Leitch application. Furthermore, series resonant relay circuits and series-parallel resonant relay circuits could be combined in one controller if such were desired.

In Fig. 2 a motor 20 is shown as a three-phase wound rotor induction motor provided with Y-connected secondary resistors 21 which may be short circuited by means of an electromagnetic contactor 22 operable by a winding 22w. The energizing circuit for the winding 22w is completed through the normally closed contacts 13a of the relay 13. The operating coil 13w for the relay 13 is part of the control circuit 14 which is the same as that shown in Fig. 1 and like parts thereof are referred to by like numerals. The control circuit 14 is energized from the secondary circuit of the motor 20 through an auto-transformer 15. Other means for connecting the control circuit 14 to the secondary circuit may be employed, such as, for example, a direct connection across two terminals of the secondary winding or across a portion of the acceleration resistor.

The primary winding of the motor 20 is arranged to be connected to the source of power indicated by the conductors L1, L2 and L3 by means of an electromagnetic contactor 25 having an operating winding 25w and normally open auxiliary contacts 25a. A switch 26 is arranged to control energization of the winding 25w and consequent operation of the contactor 25.

In operation, closure of the switch 26 completes a circuit through the winding 25w from the conductors L2 and L3. The contactor 25 in response to energization of its operating winding 25w closes its main contacts to connect the conductors L1, L2 and L3 to the primary winding of the motor 20. Immediately thereafter there is induced in the secondary circuit of the motor 20 a voltage of considerable magnitude and having a frequency equal to line frequency. This voltage is impressed through the auto-transformer 15 across the control circuit 14 and a current corresponding to portion s of curve B of Fig. 3 is caused to flow through the winding 13w of the relay 13. The relay 13 in response to energization of its operating winding 13w by a current such as indicated by portion s of curve B opens its contacts 13a to interrupt the circuit to the operating winding 22w of the accelerating contactor 22. The uncompleted circuit to the operating winding 22w is from the conductor L2, the now closed contacts 25a, the now open contacts 13a, and the winding 22w, to the conductor L3.

As the motor 20 accelerates due to the connection of its primary winding to a source of alternating current, the magnitude and frequency of the induced rotor voltage gradually decrease. Due to the phenomenon of series resonance, however, the current through the winding 13w gradually increases at this time. The capacity of the condenser 12 is so chosen in relation to the inductance of the magnetic circuit of the relay 13 that a series resonant condition occurs at some predetermined speed of the motor 20, such as the speed which will cause the induced voltage to have a frequency of thirty cycles. The additional inductance, by increasing the capacitive reactance of the circuit, causes the series resonant condition to occur when the voltage and frequency are slightly higher than when the inductance is not present. The gradual reduction in impedance of the series circuit including the condenser 12 and the relay winding 13w causes a gradual rise in relay current until the point $r$ of curve B is reached. By virtue of this increased relay current, the relay contacts 13a are positively held in the open position during this period. The addition of the inductance 11 in parallel with the condenser 12 results in a higher relay current during this interval as indicated by the difference between the portion $o$ of curve A and the portion $s$ of curve B.

Shortly after the frequency and voltage reach the predetermined values, the series-resonant condition disappears, and the control circuit current starts to fall. At a slightly lesser value of frequency and voltage the parallel circuit including the condenser 12 and the inductance 11 is designed to become parallel resonant, resulting in a greatly increased impedance. As a result the relay current drops to nearly zero almost instantly. The winding 13w is therefore practically deenergized and the relay 13 thereupon closes its contacts 13a to permit energization of the winding 22w. The contactor 22 in response to energization of its operating winding 22w closes its contacts to short circuit the resistor 21 to permit the motor 20 to accelerate to normal speed.

Deenergization of the relay 13 causes a change in its magnetic circuit and thus changes the inductance of the operating winding 13w. This change in inductance is such that the series-resonant condition cannot occur again unless a somewhat higher value of frequency and voltage than the resonant frequency and voltage is impressed on the circuit 14. This fundamental fact prevents fluttering of the relay during closing.

To stop the system, it is only necessary to open the switch 26, which will interrupt the circuit to the winding 25w.

I claim:

1. A control circuit comprising a capacitance and a non-saturable inductance which are connected in series and are responsive to coexistent variations in voltage and frequency, when said voltage and frequency are varying concurrently in the same direction, to change from a predetermined condition to a different condition and which are in series resonant condition at a predetermined value of said voltage and frequency, one of said conditions being series resonant and the other of said conditions not being series resonant, and an additional non-saturable inductance connected so as to form a parallel circuit with the capacitance and so related in electrical value to said capacitance as to be operative to render the said parallel circuit resonant at a different predetermined value of said voltage and frequency for altering the normal operative effect of said change.

2. A control circuit comprising a capacitance and a non-saturable inductance which are connected in series and are responsive to coexistent variations in voltage and frequency to become series resonant at a predetermined value of said voltage and frequency when said voltage and frequency are varying concurrently in the same direction, and to change from a series resonant condition to a condition which is not series resonant, and an additional non-saturable inductance connected so as to form a parallel circuit with the capacitance and so related in electrical value to said capacitance as to be operative to render the said parallel circuit resonant at a different predetermined value of said voltage and frequency for altering the normal operative effect of said change.

3. A control circuit comprising a capacitance and a non-saturable inductance which are connected in series and are responsive to coexistent variations in voltage and frequency to become series resonant at a predetermined value of said voltage and frequency and to change from a condition which is not series resonant to a series resonant condition, when said voltage and frequency are varying concurrently in the same direction, and an additional non-saturable inductance connected so as to form a parallel circuit with the capacitance and so related in electrical value to said capacitance as to be operative to render the said parallel circuit resonant at a different predetermined value of said voltage and frequency for altering the normal operative effect of said change.

4. A control circuit comprising a capacitance and a non-saturable inductance which are connected in series and are responsive to coexistent variations in voltage and frequency, when said voltage and frequency are varying concurrently in the same direction, to change from one condition to another, one of said conditions being inductively reactive and the other of said conditions being capacitively reactive, and an additional non-saturable inductance connected so as to form a parallel circuit with the capacitance and so related in electrical value to said capacitance as to be operative to render the parallel portion of the control circuit resonant at a predetermined value of said voltage and frequency for altering the normal operative effect of said change.

5. A control circuit including a non-saturable electromagnetic relay operating means and relay operated thereby for controlling a power circuit, a capacitance, the capacitance and the relay operating means being connected in series and responsive to coexistent variations in voltage and frequency to change from a condition which is not series resonant to a series resonant condition, when said voltage and frequency are varying concurrently in the same direction, and operative upon said change to operate the relay, and capable of becoming series resonant at a predetermined value of said voltage and frequency, and a non-saturable inductance connected so as to form a parallel circuit with the capacitance and so related in electrical value to said capacitance as to be operative to render the said parallel circuit resonant at a different predetermined value of said voltage and frequency for altering the normal operative effect of said change.

6. The combination with a circuit providing electrical energy having a frequency and voltage varying concurrently in the same direction, of a non-saturable, series-parallel resonant, relay operating circuit connected for operation by the said circuit.

7. A relay circuit adapted to be connected to a source of power having a decreasing voltage and a declining frequency, comprising a non-saturable electromagnetic operating means for the relay, a non-saturable inductance and a capacitance connected in parallel with each other, the operating means being connected in series therewith, whereby the operating means, when the relay circuit is connected to said source, is subjected to a high current at relatively high frequency and large voltages, a higher current at intermediate frequencies and voltages, and substantially no current at frequencies and voltages lower than said intermediate frequencies and voltages.

8. A relay circuit adapted for operation by a source of electrical power having a decreasing voltage and a declining frequency and including a non-saturable inductive operating winding for the relay, a non-saturable inductive circuit, a capacitive circuit, said inductive circuit and said capacitive circuit being connected in parallel circuit relation with each other, means to connect the parallel circuit including the inductive circuit and the capacitive circuit in series with the operating winding across the source of power, the relative values of the inductance of the inductive circuit, the capacitance of the capacitive circuit, and the inductance of the operating winding being such that at a predetermined value of frequency and voltage the current in the operating winding declines from a maximum to a minimum and, at all higher values of frequency and voltage, is substantially above said minimum.

9. A resonant relay circuit comprising a non-saturable electromagnetic relay operating means, a condenser, said means and said condenser being connected in series and responsive to coexistent variations in frequency and voltage so as to become series resonant at a predetermined value of said voltage and frequency, and a non-saturable inductance connected in parallel with said condenser and being so related to the reactance of the condenser and the relay operating means that a greater variation exists between the capacitive reactance and the inductive reactance of the relay circuit as the relay circuit is caused to pass thru series resonance due to variations in said voltage and frequency.

ASA H. MYLES.